Dec. 9, 1924.
1,518,755
J. W. PURVIS
HEAVY PIPE TONGS
Filed Jan. 30, 1923
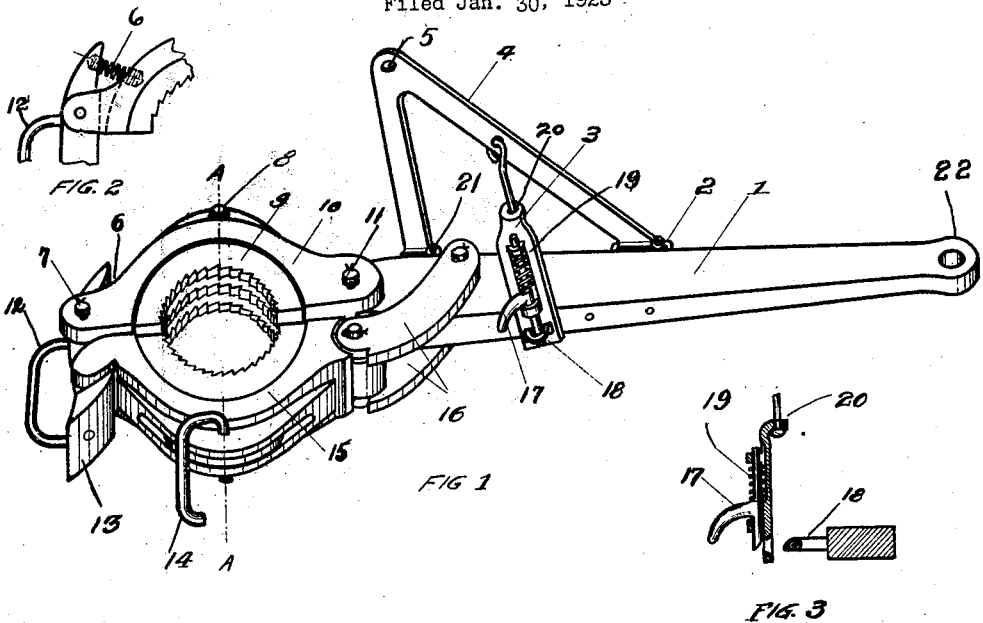
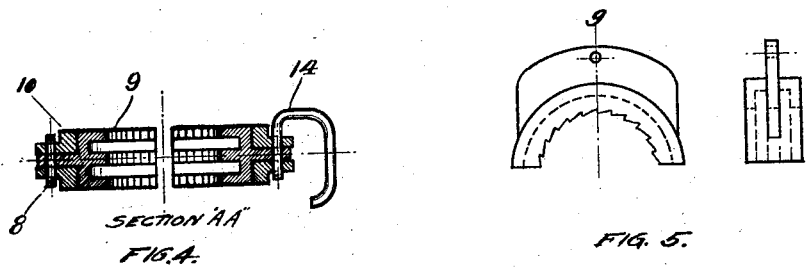
INVENTOR.
BY
ATTORNEY.

Patented Dec. 9, 1924.

1,518,755

UNITED STATES PATENT OFFICE.

JAMES W. PURVIS, OF HOUSTON, TEXAS.

HEAVY PIPE TONGS.

Application filed January 30, 1923. Serial No. 615,931.

*To all whom it may concern:*

Be it known that I, JAMES W. PURVIS, a citizen of the United States, residing at Houston, in the county of Harris and State of Texas, have invented certain new and useful improvements in Heavy Pipe Tongs for use in making up or screwing together and breaking out or unscrewing the joints of drill stem, casing, or other pipe in the drilling of oil and gas wells and similar operations, of which the following is a specification.

This invention relates to new and useful improvements in pipe tongs for use in the making up, or screwing together, and breaking out, or unscrewing, the joints of drill stem, casing and other pipe used in the drilling of oil and gas wells, and similar operations.

The invention is expected to be used in connection with rotary drilling rigs, and is designed to be operated in making up, or screwing together, the pipe by power derived from the cat-head or other power pulleys forming a part of such machinery; and in breaking out, or unscrewing, the pipe, the power may be furnished by the rotary forming a part of such drilling rigs.

The use of heavy pipe tongs in connection with such rotary drilling operations is not new, but in common practice it is necessary to have separate tongs for screwing together and unscrewing the pipe, and to use different tongs for each different size of pipe to be operated upon. The power used in screwing the pipe together is usually applied by means of a line from the handle of the tong extending to and operated upon the cat-head or other power pulleys of the rig. In unscrewing the pipe the power is sometimes applied by revolving the rotary, the tong being fastened above the joint of pipe to be unscrewed and the rotary being below the joint; and in this way the pipe can be unscrewed by rotating the lower pipe in the same direction as though it were being screwed together, and thus prevent the unscrewing thereof in the well.

One object of the invention is to provide a device or tool of the character described adapted to be suspended above the ground, derrick floor or other working platform, in such manner as to swing freely to the casing, drill stem or other pipe to be operated upon, when in use, and to be swung back out of the way when not in use; and to be so suspended at such distance above the ground, derrick floor or other working platform as to be attached to the drill stem, casing or other pipe at the proper place and in proper position to facilitate the work of making up, or screwing together, and breaking out, or unscrewing, the drill stem, casing or other pipe; and being so constructed and suspended that it may be almost instantly changed from the position necessary for use in making up, or screwing together, the pipe, to that necessary for use in the breaking out, or unscrewing, the same, so that either or both operations can be carried on by the use of a single tong, and without loss of time.

Another object is to provide pipe tongs having teeth so constructed that they may be readily inserted in and removed from the jaws of the tongs, and other teeth inserted in lieu thereof, so that by using different sizes of such teeth the same tong may readily be used on drill stem, casing or other pipe of different sizes, and thereby obviating the necessity of using different size tongs for each separate size of drill stem, casing or other pipe to be operated upon.

Another object of the invention is to provide a pipe tong with a bar catch at the front end of the jaws of the tong, operated by a spring or other similar devices, and so constructed as to facilitate the work of operating the tong, and to fit and hold securely when in operation.

Another object of the invention is to provide a pipe tong with teeth constructed in multiple rows, so as to increase the gripping and holding power of the tong, but without weakening either the teeth or the jaws of the tong.

With the above, and other objects in view, the invention has particular relation to certain novel features of construction, operation and arrangement of parts, an example of which is given in this specification, and illustrated in the accompanying drawings, wherein:—

Fig. 1 is a perspective view of my invention, showing the jaws closed with the teeth in place and latch and clasp both fastened as when in use.

Fig. 2 shows a top plan view of a part of the latch used for holding the jaws in position while in use, and shows also the spring used in the operation of the clasp in place, and the method by which one end of the clasp is fastened to one of the jaws of the tong.

Fig. 3 shows a sectional view of the clasp used to fasten the triangular-shaped suspension bar to the handle of the tong as the same appears when in use.

Fig. 4 shows a transverse sectional view of the tong on lines AA of Fig. 1.

Fig. 5 shows a top view of the teeth of the tong with the plate which forms a part thereof, and also a cross-section view of the same showing the teeth in three rows.

Referring more particularly to the drawings: the numeral 1 designates the handle of the tong, to one edge of which the triangular-shaped suspension bar 4 is fastened by the loose hinges 2 and 21, and to the other edge of which is fastened the staple into which the clasp 3 is inserted when the tong is in use.

In one end of this handle is a hole 22, into which is tied one end of the line extending to the cat-head or other power pulley of the drilling rig which furnishes the power for operating the tong when in use in making up, or screwing together, the joint of drill stem, casing or other pipe; and into which may be hooked or otherwise fastened a line extending in the opposite direction and fastened to a leg of the derrick or other firm anchorage when the tong is being used to break out, or unscrew, the drill stem, casing or other pipe by the action of the rotary of the drilling rig operating on the part of the pipe below the joint to be broken out.

To the other end of the handle are fastened on the one side by the pin 11 and on the other by the links 16 the two jaws 10 of the tong. These jaws are constructed with a slot into which is inserted the plate forming a part of the teeth carrying member 9, and with a double extension of their outer faces, with holes in the upper and lower extensions fitting the hole in the edge of the plate, see top of Fig. 5; the teeth being fastened into place in the jaws by the pins 8 and 14. The jaws are, preferably, arcuate and the teeth, in each jaw, are formed in a plurality of rows, formed integrally together and of a contour to fit within the inner sides of the jaws, and the outer side of the tooth carrying member carries the plate which is formed integral therewith and which fits into the slot of the corresponding jaw.

These teeth are preferably made with multiple rows so as to increase the gripping or holding power of the tong; and are easily removable by opening the jaws of the tong and removing the pins 8 and 14; and in that way the tong is readily adjustable to different sizes of pipe by the use of different sizes of teeth adapted to the different sizes of pipe to be operated on. The teeth being so constructed that the shoulder thereof fits against the jaws of the tong and thereby increases the strength and resisting power of the teeth.

The double extensions on the outer edges of the jaws not only operate as a method of holding the teeth in place by means of the pins 8 and 14, but add greatly to the strength of the jaws themselves.

To the outer end of one of the jaws of the tong is fastened by means of the pin 7 a bar latch, the other end of which forms a catch 13 which fits into a groove in the end of the opposite jaw. The latch is held in place by the spring 6 and has attached a handle 12 for use in opening and closing and to facilitate the handling of the tong. By means of this latch the jaws of the tong may be readily opened and closed by a single movement of the operator, and is so constructed that it will remain in place while the tong is in operation. The pin 14 may be extended in the manner shown by the drawings, Fig. 1, so as to form a convenient hand-hold for the use of the operator in handling the tong.

In use the tong is suspended by a wire or other line attached to the top of the triangular-shaped suspension bar 4 at the apex thereof 5; and in order to change the tong from its position while being used to make up, or screw together, a section of pipe to that necessary to break out, or unscrew, the same, or vice versa, it is only necessary for the operator to take hold of the catch 17 and lift the bolt 19 out of the staple 18, turn the tong over so as to reverse the position of the teeth and reinsert the bolt in the staple, in the meantime letting the clasp 3 hang freely and turn on the swivel 20.

What I claim is:

1. A tong including a handle, a jaw pivoted, at one end, to one end of the handle, a pair of swinging links pivoted, at one end, on opposite sides of the handle, a jaw pivoted, at one end, between the other ends of said links, each jaw having a slot, reinforcing extensions on opposite sides of said slots, on the outer side of each jaw, a plurality of rows of teeth formed integrally together and of a contour to fit within the inner sides of the jaws, plates formed integrally with the rows of teeth and fitted through the respective slots, pins fitted through the respective extensions of each jaw, and through the corresponding plates, as well.

2. A tong including a handle, a jaw pivoted, at one end, to one end of the handle, a pair of swinging links pivoted, at one end, on opposite sides of the handle, a jaw pivoted, at one end, between the other ends of said links, each jaw having a slot, reinforcing extensions on opposite sides of said slots, on the outer side of each jaw, a plurality of rows of teeth formed integrally together and of a contour to fit within the inner sides of the jaws, plates formed integrally with the rows of teeth and fitted through the respective slots, pins fitted through the respective extensions of each jaw, and through the corresponding plates, as well, one of said pins being extended and formed into a grip.

3. A tong including a handle, a jaw pivoted, at one end, to one end of the handle, a pair of swinging links pivoted, at one end, on opposite sides of the handle, a jaw pivoted, at one end, between the other ends of said links, each jaw having a slot, reinforcing extensions on opposite sides of said slots, on the outer side of each jaw, a plurality of rows of teeth formed integrally together and of a contour to fit within the inner sides of the jaws, plates formed integrally with the rows of teeth and fitted through the respective slots, pins fitted through the respective extensions of each jaw, and through the corresponding plates, as well and a latch carried by the free end of one jaw and adapted to engage with the other jaw to hold said jaws in pipe engaging position.

In testimony whereof, I have signed my name to this specification in the presence of two (2) subscribing witnesses.

JAMES W. PURVIS.

Witnesses:
    DAVID BALL,
    L. E. LOCKE.